United States Patent [19]

Pecheux

[11] E Patent Number: Re. 33,182

[45] Reissued Date of Patent: Mar. 20, 1990

[54] RE-EDUCATION APPARATUS FOR THE ARTICULATED SEGMENTS OF THE HAND

[75] Inventor: Jean-Claude R. Pecheux, Charleville Mezieres, France

[73] Assignee: Compagnie Generale de Materiel Orthopedique, France

[21] Appl. No.: 323,481

[22] Filed: Mar. 14, 1989

Related U.S. Patent Documents

Reissue of:

[64] Patent No.: 4,679,548
Issued: Jul. 14, 1987
Appl. No.: 695,162
Filed: Jan. 25, 1985

[30] Foreign Application Priority Data

Jan. 2, 1984 [FR] France ..... 84 01732

[51] Int. Cl.[4] ..... A61H 1/02
[52] U.S. Cl. ..... 128/26; 128/77
[58] Field of Search ..... 128/26, 77, 25 R, 80 R, 128/87 R, 87 A

[56] References Cited

U.S. PATENT DOCUMENTS

| | | | |
|---|---|---|---|
| 585,799 | 7/1897 | Thompson | 128/26 |
| 1,007,526 | 10/1911 | Caro | 128/25 R |
| 1,204,437 | 11/1916 | Heinze | 128/26 |
| 3,089,700 | 5/1963 | Hotas | 128/25 R |
| 3,631,542 | 1/1972 | Potter | 128/77 |
| 3,756,222 | 9/1973 | Ketchum | 128/26 |
| 3,850,166 | 11/1974 | Tamny | 128/77 |
| 4,368,728 | 1/1983 | Pasbrig | 128/26 |
| 4,665,900 | 5/1987 | Saringer | 128/26 |

FOREIGN PATENT DOCUMENTS

| | | | |
|---|---|---|---|
| 73434 | 2/1894 | Fed. Rep. of Germany | 128/26 |
| 293622 | 5/1917 | Fed. Rep. of Germany | 128/77 |
| 2017645 | 11/1970 | Fed. Rep. of Germany | 128/26 |
| 487899 | 5/1918 | France | 128/26 |
| 606599 | 2/1925 | France | 128/26 |
| 1261410 | 4/1961 | France . | |
| 1439754 | 4/1966 | France . | |
| 2109426 | 5/1972 | France . | |
| 569309 | 8/1977 | U.S.S.R. | 128/26 |
| 1139450 | 2/1985 | U.S.S.R. | 272/67 |
| 21783 | of 1892 | United Kingdom | 128/26 |
| 206455 | 11/1923 | United Kingdom | 128/26 |
| 265448 | 2/1927 | United Kingdom | 128/26 |

OTHER PUBLICATIONS

Ochydactyl; 3/24/25.

*Primary Examiner*—Richard J. Apley
*Assistant Examiner*—H. Flaxman
*Attorney, Agent, or Firm*—Pravel, Gambrell, Hewitt, Kimball & Krieger

[57] ABSTRACT

An apparatus for re-educating the finger joints of a hand. The hand is rested on a support at a finger joint and an articulated segment of a finger is engaged by the apparatus. Portions of the apparatus move so that the finger tips of the engaged fingers are moved in a spiral path toward the palm using the support as a fulcrum. This spiral motion is performed by a single, motor-driven slide-guide to which one or more of the articulated segments are engaged.

15 Claims, 6 Drawing Sheets

RE-EDUCATION APPARATUS FOR THE ARTICULATED SEGMENTS OF THE HAND

Matter enclosed in heavy brackets [ ] appears in the original patent but forms no part of this reissue specification; matter printed in italics indicates the additions made by reissue.

The present invention relates to the re-education of free articulation of the articulated segments of the hand, namely in particular, the metacarpophalangeal articulations, and the proximal and distal interphalangeal articulations, not excluding however the wrist articulation in general, considered according to the invention, as forming also part of the hand.

The recovery of the freedom of articulation and of angular amplitude of the articulated segments of the hand, after fractures or surgical interventions is, as we know, essentially dependent on the possibility of restoring the mobility of the affected articulated segments. Such a re-education has always necessitated the services of a specialist, such as a kinetotherapist, mainly because of the special anatomical nature of the hand.

The prior technique has, up to now, offered no really satisfactory apparatus capable of replacing the manual intervention and capable of adjustably training the articulated segments to move, whilst taking into account the anatomical and physiological nature of the hand.

It is precisely the object of the invention to fill this gap by proposing an apparatus for re-educating by restoring mobility which is particularly adapted to the anatomical characteristics of the articulated segments of the hand. The object of the invention is designed so as to be automatically adjustable and adaptable for training one or more articulated segments without the intervention of a practitioner.

The invention proposes to this effect an apparatus which, by its design and adaptability, permits a phase of post-operative training, if only a passive one, to at least some of the articulated segments of the hand, without any risk of any violent and traumatizing strain.

One object of the invention is to propose a re-education and mobility-restoring apparatus which is readily adaptable for passive and/or active mobilization, of a right hand or left hand, indifferently, a small hand or a big hand, by simple adaptation of at least some of its structural elements.

Another object of the invention is to propose a mobility-restoring apparatus which is particularly simple, strong and reliable, and which can, in addition, be produced as a fixed apparatus or as a portable one, particularly adapted for re-education and training in the home.

These objects are reached, according to the invention, with a mobility restoring apparatus comprising:

- a drive member with at least one driving shaft,
- a slide-guide which extends radially with respect to the shaft and which is adapted to be angularly moved by the latter,
- a sliding block guided by said slide-guide and associated to a return member urging said block in a centrifugal movement with respect to the shaft,
- means of driving the slide-block in a centripetal movement with respect to the angular movement in one direction of the slide-guide caused by the shaft,
- a resting support for the hand which extends in parallel to the geometrical axis of the driving shaft,

- at least one bar carried by the sliding block, to be extended in parallel to the support,
- and connection means between said bar and at least one of the articulated segments of the hand.

The invention will be more readily understood on reading the following description with reference to the accompanying drawings in which.

Figure 1:
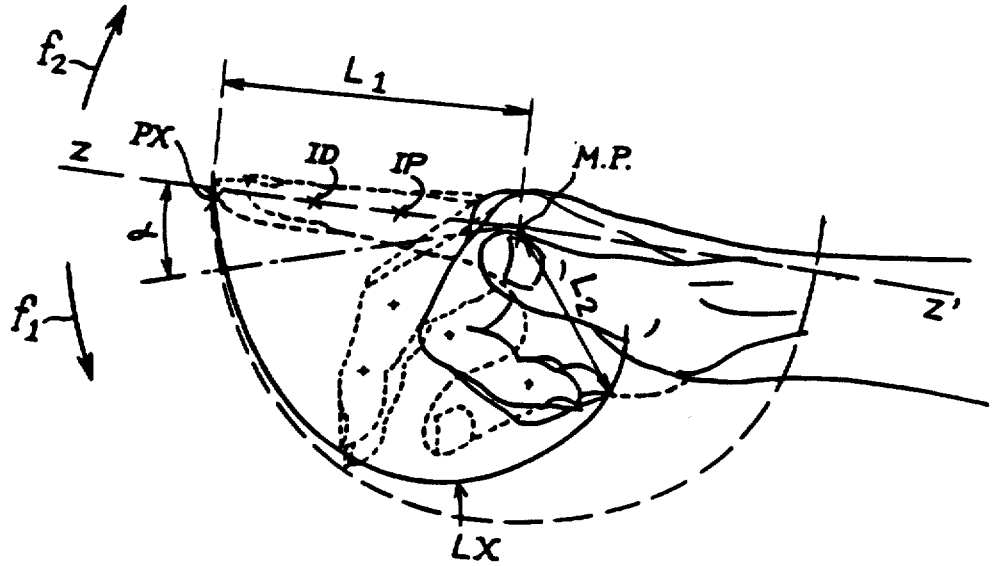
FIG. 1 is a diagrammatical illustration of the anatomical characteristic of for example a right hand.

Referring first to FIG. 1, this shows a hand in a stretched state in which the different fingers and the palm extend inside a plane Z—Z'. In this state, the different parts of the skeleton of the hand, namely the metacarpals, phalanges, middle phalanx and distal phalanx, are aligned inside said plane Z—Z'. It may also be considered, in this particular state, that the articulations of the longer fingers, namely the metacarpophalangeal (MP) articulations, the proximal interphalangeal (PI) articulations and the distal interphalangeal (DI) articulations, are also aligned inside the same plane. For every longer finger, the total length $L_1$ represents the distance separating an MP articulation from the point PX corresponding to the end of the considered finger.

The bending control of the fingers, in the direction of arrow $f_1$, results first in an urging of the MP articulations, then, progressively and depending on the angular amplitude which is reached, by an urging of the IP articulations and finally, by an urging of the ID articulations.

Thus, as the bending movement progresses in the direction of arrow $f_1$, the distance separating, for every finger, the MP articulation from the point PX reduces, taking, for one reference finger, the value $L_2$ in a virtually fully bent state.

It is clear from FIG. 1 that the successive urging of the different articulations results in a progressive bending represented by a curve LX which somewhat resembles a spiral.

A mobility-restoring and re-education apparatus must therefore take this physiological particularity into account in order to be able to move, if only passively, the articulated segments of the hand and of the longer fingers.

The apparatus according to the invention is designed to meet this requirement.

In the first embodiment illustrated in FIGS. 2 to 5, the mobility-restoring apparatus comprises a drive member 1, preferably constituted by an electrical motor-reducer group mounted in a support, casing or housing 2 carried by a structure 3. By way of example, the structure 3 can be constituted by an underframe 4 on which is fixed by way of an adjusting jaw 5, a system 6 of adjustable bars carrying a support cradle 7 for the forearm.

The electric motor 1 is of the type with two directions of rotation and its supply is controlled by a general control switch, not shown in the drawings, as well as by two end-of-stroke reversing contactors 8a, 8b, adjustable in position. Said contactors 8a–8b are accessible from the outside of casing 2 and can be adjusted correspondingly to one or more dials or scales bearing graduations representing angular amplitudes. The reversing contactors are designed to be actuated by way of a movable member, schematized in 9 in FIG. 2, carried by at least one driving shaft 10 of the motor 1.

Figure 3:
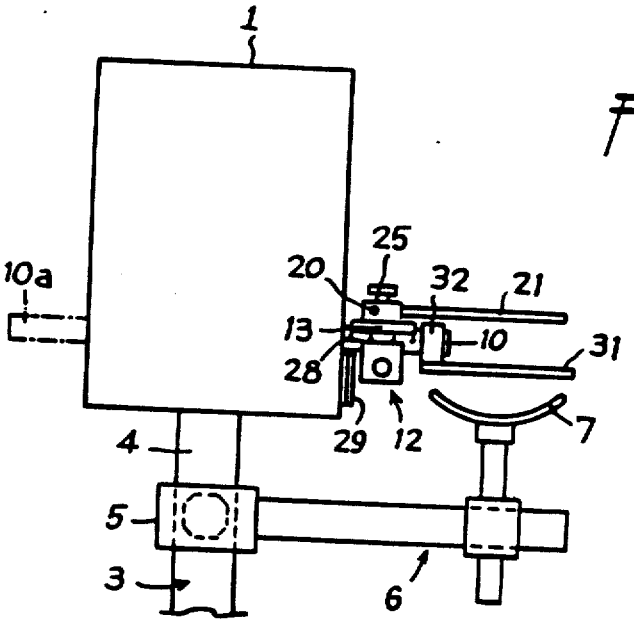
FIG. 3 is a cross-section taken along line III—III of FIG. 1.

FIG. 3 shows that motor 1 could be selected to comprise two diametrically opposite driving shafts 10 and 10a, thus offering a reversible possibility of adapting the different members constituting the apparatus, such as described hereinafter.

The driving shaft 10 supports, externally to casing 1, a slide-guide 11, wedged at an angle on the driving shaft by any suitable means. Said slide-guide is mounted so as to extend in the direction opposite the cradle 7 with respect to shaft 10.

Figure 4:
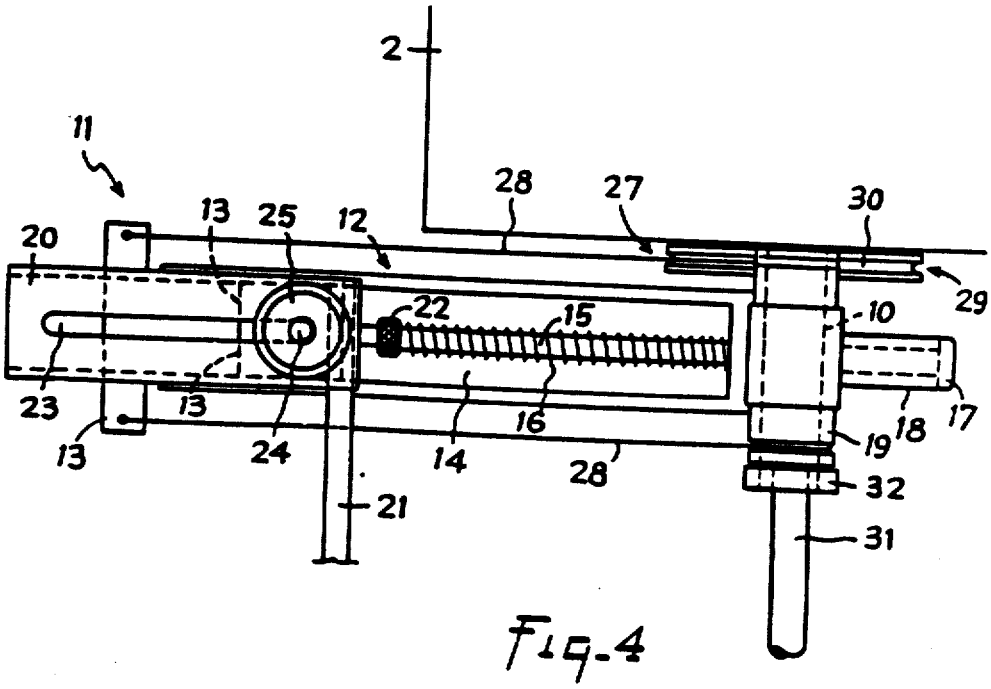
FIG. 4 is a partial plan view taken substantially along line IV—IV of FIG. 2.
Figure 5:
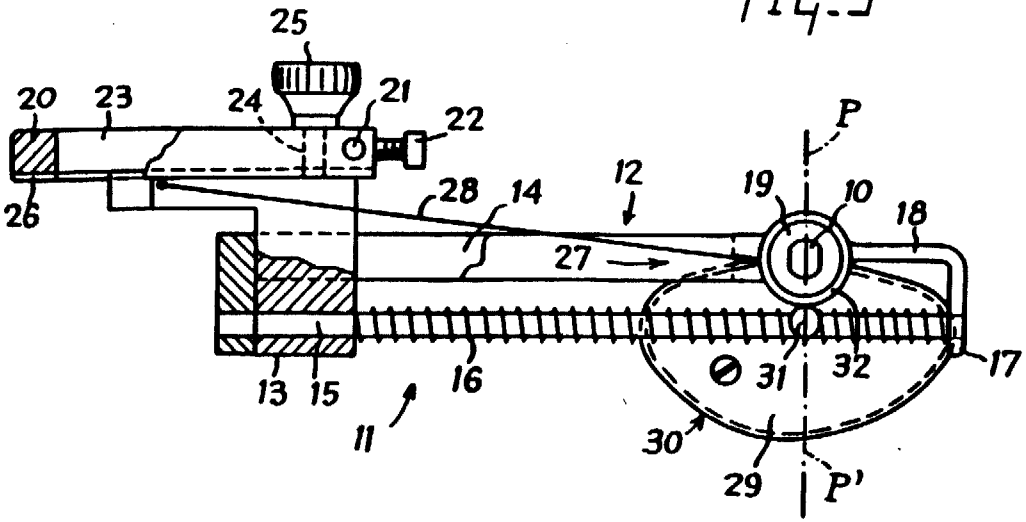
FIG. 5 is an elevational partly stripped cross-section taken along line V—V of FIG. 4.

Slide-guide 11, illustrated in more details in FIGS. 4 and 5, is for example, produced in the form of a bar 12 forming or comprising means 13 of supporting and linearly guiding a slide-block 13, which is movable in centripetal or centrifugal manner, a radial rectilinear direction with respect to shaft 10. Said support and rectilinear guiding means can be of various types. For example, the bar 12 can define an opening 14 which extends in parallel to the longitudinal axis of the rule to cooperate with a complementary counterpart provided on the slide-block. It is also possible for the slide-block to be mounted on at least one guide rod 15.

Guide-block 13 is permanently urged in centrifugal movement by a return member 16, preferably an elastic member. In the illustrated example, the elastic member 16 is constituted by a helical spring working under compression, and mounted concentrically on rod 15. The spring is tensioned between the slide-block 13 and an abutment 17 formed by an extended portion 18 of the bar 12. Said abutment 17 also acts as a support for the rod 15.

The bar 12 comprises, between the abutment 17 and opening 14, a bearing or sleeve 19 for positioning and angular locking on driving shaft 10. Different technical means can be used to fulfill this function and for example, as illustrated in FIG. 5, the sleeve 19 can comprise two diametrically opposite flat portions, designed to cooperate with complementary flat portions provided on the shaft 10.

The slide-block 13 supports a piece 20 carrying a small bar 21 which extends in parallel to shaft 10. Small bar 21 is preferably adjustable in extension, for example by means of a locking screw 22. The piece 20 is mounted on slide-block 13 through an opening 23 through which is threaded a pin 24 rising from the slide-block and provided with a tightening member 25. Opening 23 is so provided as to extend in parallel to the axis of opening 14. Longitudinal guiding means are provided between piece 20 and slide-block 13. Such means can be constituted by flanges 26 extending the piece 20 downwardly to cooperate with the side faces of slide-block 13.

Slide-block 13 is also operationally coupled to means 27 designed to cause its centripetal movement on the bar 12, in relation to the angular movement of the slide-guide by the shaft 10, in the direction of arrow $f_1$. The means 27 comprises, first of all, at least one flexible but non-extendable cable or wire 28. Said cable is fastened between, substantially, the axis of the sleeve 19 and the slide-block 13, in such a way as to be able to extend laterally to the slide-guide 12 and externally thereto. The means 27 further comprise a cam 29 secured on the bearing structure, in such a way that its plane coincides with the plane in which said cable or wire 28 moves, during the angular movement of slide-guide 12. In the illustrated example, the cam 29 is secured on the casing or housing 2. Said cam 29 has a profile which is such that the winding of the cable imparts a centripetal movement to slide-block 13 such that the small bar 21 follows a resultant path comparable to curve LX described in reference to FIG. 1.

The apparatus according to the invention further comprises a bearing support 31 constituted by a rigid rod secured to the periphery of a ring 32 adapted to be mounted with a possibility of rotation on the end part of shaft 10 which projects from sleeve 19. Said rod 31 is designed to extend in parallel to shaft 10 and to small bar 21.

The apparatus such as described hereinabove can be used in many different ways. According to the illustrated example, the relative adaptation of the different elements constituting the apparatus is designed for an application as a means of re-educating or mobilizing segments of the right hand.

The cradle 7 is adjusted in position so that the forearm of the patient can rest thereon and that the hand can rest by the palm on bearing support 31 placed approximately plumb with the different MP articulations of the longer fingers. Piece 20 is so adjusted on slide-block 13 as to bring small bar 21 substantially close to the point PX of the longest finger in stretched position.

Figure 6:
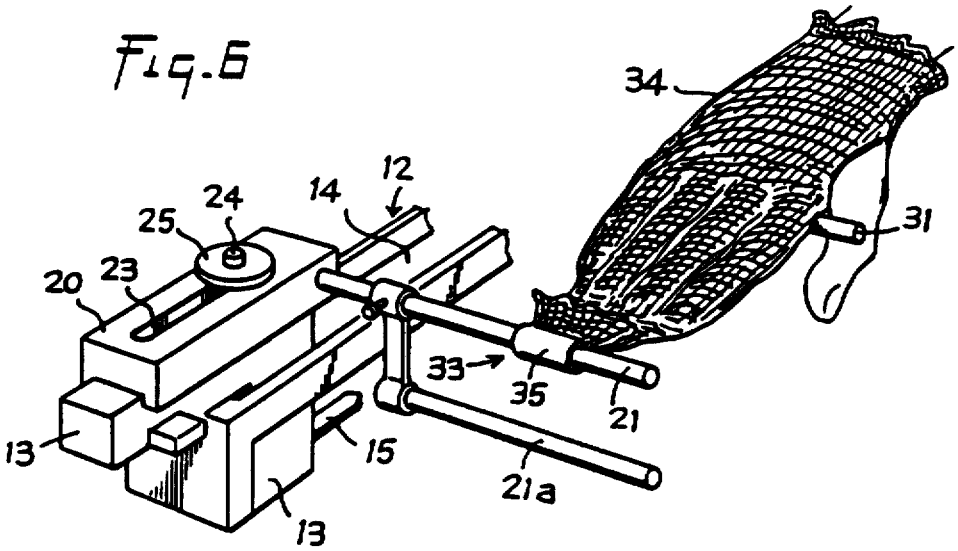
FIG. 6 is a partial perspective showing one of the elements constituting the apparatus according to the invention.

The use of the apparatus then calls on joining means between small bar 21 and for example, the assembly of longer fingers to be moved. FIG. 6 shows that such means, designated as a whole by reference 33, can comprise a net 34 shaped as a sleeve through which the longer fingers are introduced. The free end of said sleeve 34, which extends beyond the fingers, is folded over the small bar 21 and held thereon by a clip member 35.

The contactors 8a and 8b are then adjusted so as to determine the angular movement amplitude to be given to the slide-guide 12. Such an amplitude may be between a partial bending from the extension shown in FIG. 1, and a maximum bending in which distance $L_1$ reaches value $L_2$.

The rotation of shaft 10, consecutive to the supply of motor 1, moves slide guide 12 angularly in the direction of arrow $f_1$ without initially causing the centripetal movement of slide-block 13. This is permitted by the profile of the cam 29 designed to authorize an angular movement equal to range $\alpha$ (FIG. 1) corresponding to the first natural urging on the MP articulations. Indeed, during this displacement, the small bar carries the end of the net which then urges the fingers to bend.

As soon as the angular movement of the slide-guide 12 causes the cooperation of the wire or cable 28 with the profile 30 of the cam 29, slide-block 13 is urged to move in a centripetal direction according to the shape corresponding to profile 30. Thus, the bar 21 is caused to follow the curve LX and to control, via the textile sleeve 34, both the bending of MP articulations and, progressively and successively, the bending of the PI and DI articulations of the different fingers.

As illustrated in FIG. 1, the means according to the invention thus enable to urge and mobilize the longer fingers in a bending movement which is a start towards the natural clenching movement, thus working, in particularly helpful physiological conditions, all the articulations needing re-education.

In certain cases, the joining means 33 between the small bar 21 and the fingers of the hand, may use (see FIG. 7) an adjustable ring 36 for each finger. Each ring 36 is slidably threaded over a flexible plate 37 which extends from a head member 38 made of any suitable material. Said head member 38 comprises a bore 39 of orthogonal direction to said plate 37 through which bore is engaged the small bar 21.

Said means 33 enable to urge more efficiently any one of the longer fingers or all of them, by providing a possibility of bringing them closer together during the bending phase and, in reverse, to move them apart during the stretching phase, thus taking into account the anatomical diverging characteristic of the different fingers of the hand when the hand is open.

Said means 33 also permit to work the PI or DI articulations more intensively, by adjusting the cradle 7 in such a way that the hand rests on the rod 31 not as described hereinabove for the MP articulations, but for example, by resting the first phalanges on said rod. In such a case, the part 20 is also adjusted on the slide-block 13, so as to adapt the small bar 21 in relation to the length of the fingers to be moved, and thus to cause, during the curving movement according to curve LX, the bending of the PI and DI articulations only.

When the angular bending range is reached, the reversing contactor 8a, reverses the supply to motor 1 which controls the angular movement of the slide-guide 12 in the opposite direction to arrow $f_1$.

Small bar 21 is caused to move in reverse along the curve LX and in doing so controls the progressive stretching of the worked articulations as a function either of the means 33 used, or of the support adjustments carried out.

Figure 8:
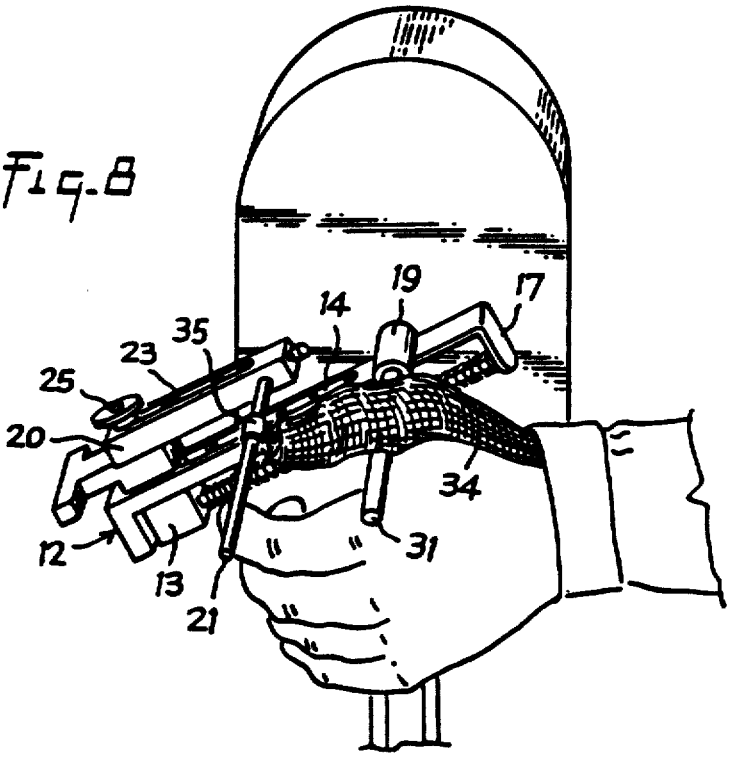
FIGS. 8 and 9 are perspectives showing two other examples of utilization of the apparatus according to the invention.

It is conceivable that the mobilization of the articulated segments of the thumb can be conducted in the same way, using the net 34 and the clamp 35 or else the ring 36 (FIG. 8).

If the mobility-restoring apparatus according to the invention is principally designed to enable simultaneous or individual mobilization of the fingers following the physiological bending characteristic thereof through the bending phase, it should be considered that the means used also permit to work a hand to be re-educated, for example, in hyper-stretching conditions.

Figure 2:
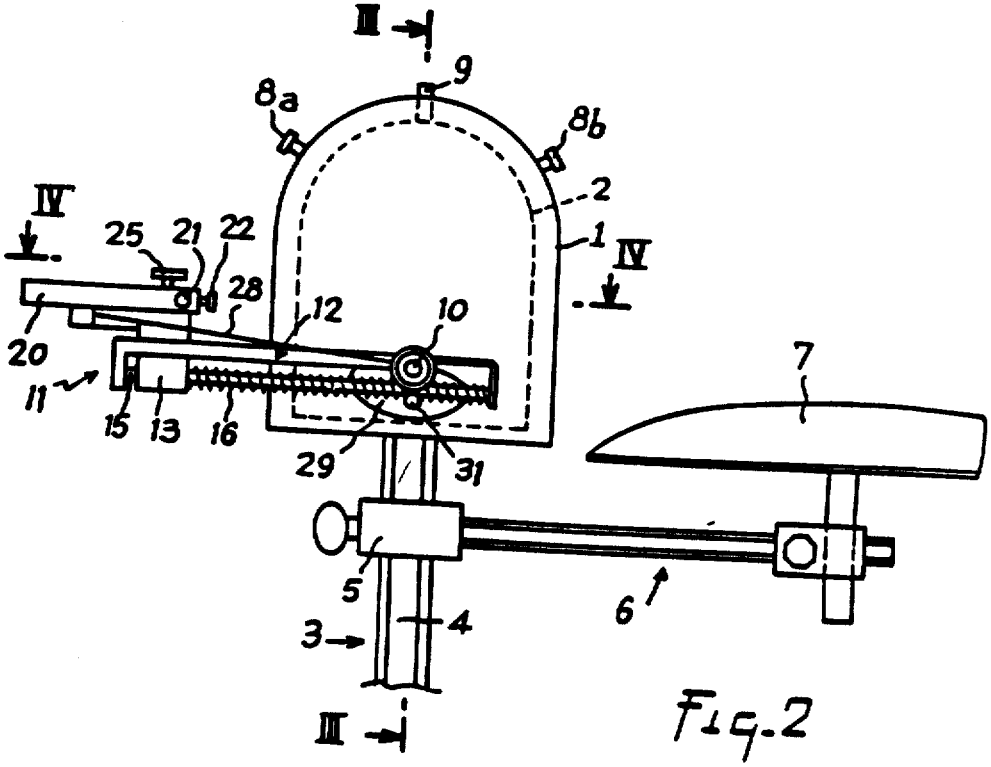
FIG. 2 is a side elevation of the apparatus according to the invention.
Figure 7:
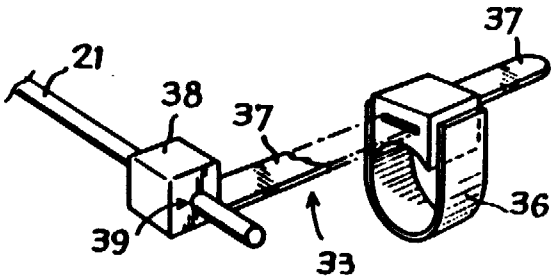
FIG. 7 is a perspective showing another embodiment of one of the elements constituting the apparatus according to the invention.

Indeed, with the means 33 of FIG. 6 or 7, it is possible to the supply motor 1 for controlling, via the reversing-contactors 8a and 8b, a rotation of the shaft 10 from the neutral position as shown in FIG. 2, along the direction of arrow $f_2$ (FIG. 1).

Figure 9:
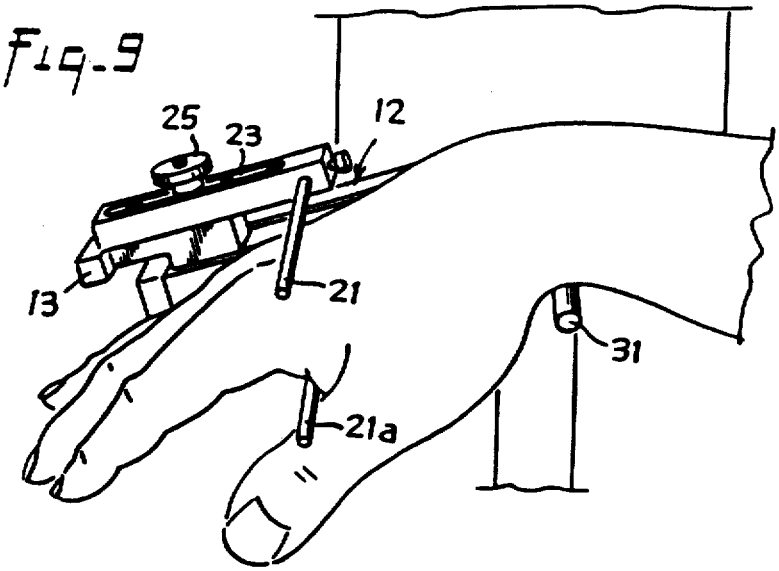

It is also possible to use the apparatus for restoring mobility to the wrist which is also considered as an articulation of the hand. In this case, the cradle 7 is adjusted in such a way as to cause the wrist to rest on rod 31, and bending or stretching, after adjusting the position of rod 21, is achieved by providing said rod with a second bar 21a, as shown in FIG. 6. Said second bar 21a is preferably adjustably movable away from the bar 21. The patient's hand is engaged between bars 21 and 21a adjusted in position by means of piece 20, to be preferably placed substantially away from the MP articulations of the different fingers (FIG. 9).

According to this particular embodiment, it is generally preferred to disconnect one end of the wire or cable 28, so that the angular movement of the slide-guide 12 does not entail the centripetal movement of slide-block 13.

FIG. 5 shows that it is possible to produce the cam 29 so that it has a symmetrical profile with respect to an axis P—P' traversing the shaft 10. Thus by providing two cables or wires 28 extending laterally of the two sides of slide-guide 12, it becomes possible to place the latter either in the position illustrated in FIGS. 2 and 5, or in a turned over position by assembly on shaft 10a, to adapt the apparatus for re-education of the left hand. In such a case, cam 29 is moved, or preferably, the structure or housing comprises a second cam working with shaft 10a.

Figure 10:
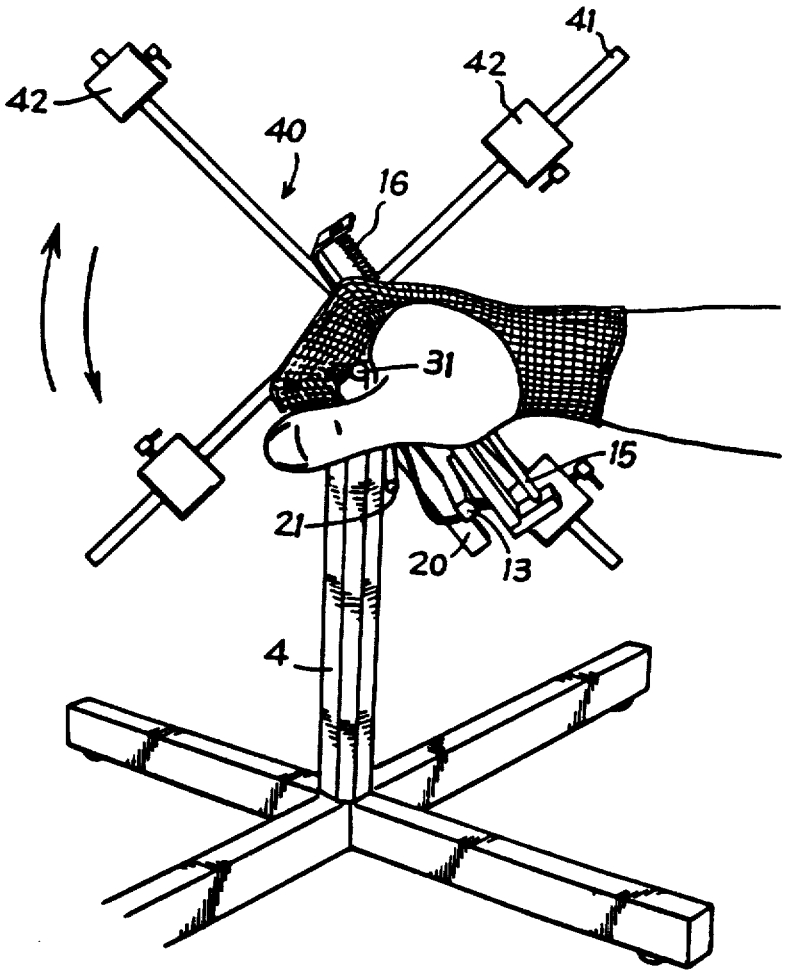
FIG. 10 is a diagrammatical perspective showing a development of the apparatus according to the invention.

FIG. 10 illustrates a development wherein the drive member is constituted by an oscillating lever 40 with multiple arm elements 41, for example four, angularly equidistant. Said arm elements 41 carry balance weights 42 of adjustable position, so as to be able to create a drive torque imparted to the shaft 10 from a stable balancing position.

In such a case, the apparatus permits to keep up a passive mobilization during the oscillating lever moving phase, thus causing an active mobilization helped or opposed by compelling the patient to cause the return of the oscillating lever 40 in its stable position by bending or stretching the fingers.

In the illustrated example of utilization in FIGS. 2 to 5, the driving member is fitted inside a housing 2 carried by a structure 3 of the fixed and non-portable type.

Figure 11:
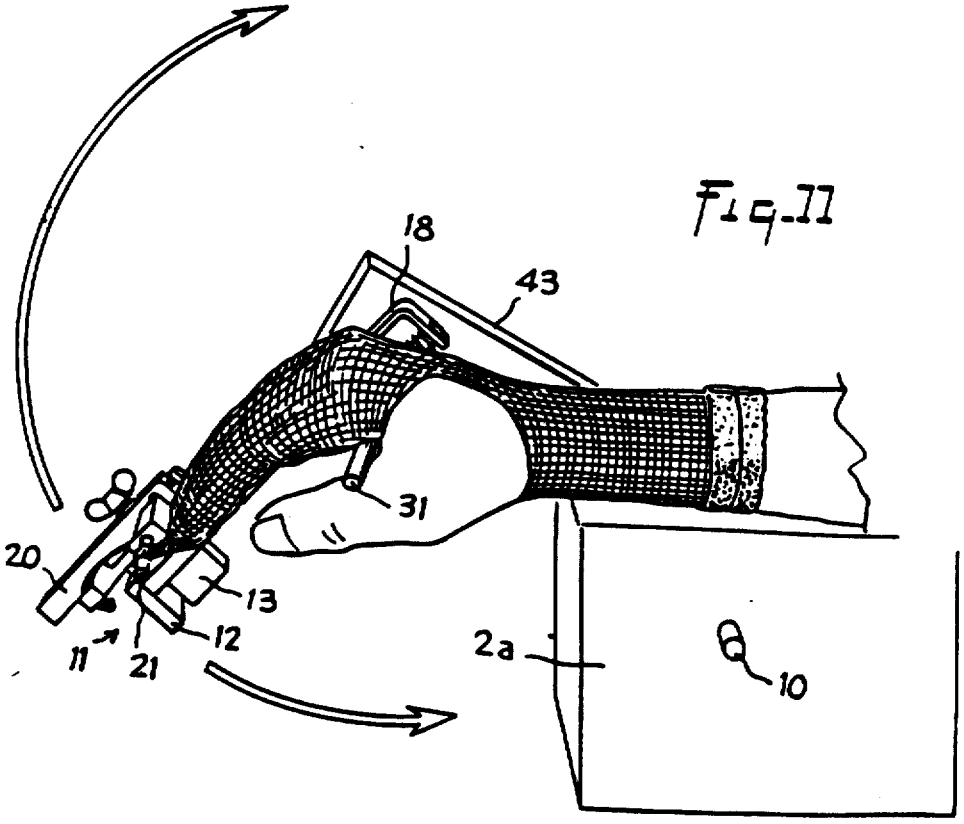
FIG. 11 is a diagrammatical perspective illustrating another embodiment of the apparatus according to the invention.

In certain cases, it may be advantageous to produce the apparatus so that it is portable, in order to help the mobilization/re-education phase conducted the patient. FIG. 11 shows that it is possible to move the motor inside a box 2a which can be adapted to support the forearm of the patient. Said box 2a comprises an intermediate arm which is driven by a remote-control transmission means from the shaft 10 or 10a of the motor. In such a case, arm 43 also supports the cam 29 as well as the resting support 31. Intermediate shaft 44 carries the slide-guide 12 as indicated hereinabove.

The invention is in no way limited to the description given hereinabove and on the contrary covers any modification that can be brought thereto without departing from its scope.

What I claim is:

1. An apparatus for restoring mobility to the articulated segments of the hand, comprising:

a driving member with at least one driving shaft, on which is fixed only one radial slide-guide;

a sliding block guided by said slide-guide and operationally coupled to a return member urging said sliding block in centrifugal movement with respect to the shaft;

a support for resting the hand, which support extends in parallel to the axis of the shaft;

at least one bar carried by the sliding block and extending in parallel to the support;

means of joining said bar to at least one articulated segment of the hand; and means of driving said sliding block in centripetal movement, in relation to the angular displacement in one direction of the slide-guide driven by the shaft, wherein the driving means is comprised of at least one wire or cable which is flexible but non-stretchable and extends sideways of the slide-guide between the sliding block and substantially the center of angular rotation of said slide-guide, and by a fixed cam carried by the structure of the driving member and offering, inside the plane in which the wire or cable moves when said slide-guide is angularly displaced, an evolutive bending profile for driving the sliding block centripetally in relation with the angular movement of the slide-guide.

2. An apparatus as claimed in claim 1, wherein the centripetal driving means comprise, on the one hand, two wires or cables which extend laterally along the two sides of the slide-guide and, on the other hand, a cam which defines two symmetrical profiles on either sides of an axis of symmetry traversing the driving shaft.

3. An apparatus as claimed in claim 1, wherein said apparatus comprises a driving member placed inside a portable housing equipped with an arm carrying the fixed cam and with an intermediate arm remotely connected to the driving shaft and operationally coupled to said slide-guide.

4. An apparatus as claimed in claim 1, wherein a structure is provided to support the motor, the cam and the handresting support, as well as for adapting an adjustable cradle for resting the forearm of the patient.

5. An apparatus for restoring mobility to the articulated segments of the hand, comprising:

a driving member with at least one driving shaft, on which is fixed only one radial slide-guide;

a sliding block guided by said slide-guide and operationally coupled to a return member urging said sliding block in centrifugal movement with respect to the shaft;

a support for resting the hand, which support extends in parallel to the axis of the shaft;

at least one bar carried by the sliding block and extending in parallel to the support;

means of joining said bar to at least one articulated segment of the hand; and means of driving said sliding block in centripetal movement, in relation to the angular displacement in one direction of the slide-guide driven by the shaft, wherein the hand resting support is comprised of a rigid rod secured to the periphery of a ring threaded for free rotation on the driving shaft.

6. An apparatus for restoring mobility to the articulated segments of the hand, comprising:

a driving member with at least one driving shaft, on which is fixed only one radial slide-guide;

a sliding block guided by said slide-guide and operationally coupled to a return member urging said sliding block in centrifugal movement with respect to the shaft;

a support for resting the hand, which support extends in parallel to the axis of the shaft;

at least one bar carried by the sliding block and extending in parallel to the support;

means of joining said bar to at least one articulated segment of the hand; and means of driving said sliding block in centripetal movement, in relation to the angular displacement in one direction of the slide-guide driven by the shaft, wherein the connection means between the bar and at least one of the articulated segments of the hand comprises a net of textile material which covers the hand at least partly and of which the end extends beyond the fingers and is fastened to the bar by a clamp member.

7. An apparatus for restoring mobility to the articulated segments of the hand, comprising:

a driving member with at least one driving shaft, on which is fixed only one radial slide-guide;

a sliding block guided by said slide-guide and operationally coupled to a return member urging said sliding block in centrifugal movement with respect to the shaft;

a support for resting the hand, which support extends in parallel to the axis of the shaft;

at least one bar carried by the sliding block and extending in parallel to the support, means of joining said bar to at least one articulated segment of the hand; and means of driving said sliding block in centripetal movement, in relation to the angular displacement in one direction of the slide-guide driven by the shaft, wherein in the connection means between the bar and at least one of the articulated segments of the hand comprises at least one ring, adaptable to one finger and threaded for free sliding over a flexible plate extending a head member which is provided with a hole, directed orthogonally to said plate and permitting the free engagement of said head member on the bar of the sliding block.

8. An apparatus for exercising the articulated segments of a hand, comprising:

support means for supporting a hand;

engaging means for engaging at least one of the articulated segments of the hand;

moving means for moving the engaging means relative to the support means in a direction that generally follows the natural movement of any articulated segments engaged by the engaging means;

wherein the moving means includes a motor, and a shaft operatively connected to the motor for rotational movement;

wherein the motor includes means for rotating the shaft in two directions and stop means for restricting movement of the shaft in both directions to a predetermined angular range;

and wherein the moving means includes translation means connected to the engaging means for translating rotational movement of the shaft to natural movement of said at least one articulated segment;

wherein the translating means includes a slide-guide connected to the shaft and a slide-block mounted to slide along the slide-guide, the engaging means being connected to the slide-block so that the slide-block can move realtive to the slide-guide as the shaft rotates the slide-guide;

wherein the slide-block includes adjustment means for adjusting the position of the engaging means relative to the support means for accomodating articulated segments of different length; and wherein the slide-block includes an adjustment block adjustably movable relative to the slide-block, and a rod projecting outwardly from the adjustment block, and means for connecting the engaging means to the rod.

9. An apparatus for exercising the articulated segments of a hand, comprising:

support means for supporting a hand;

engaging means for engaging at least one of the articulated segments of the hand;

moving means for moving the engaging means relative to the support means in a direction that generally follows the natural movement of any articulated segments engaged by the engaging means;

wherein the moving means includes a motor, and a shaft operatively connected to the motor for rotational movement;

wherein the motor includes means for rotating the shaft in two directions and stop means for restricting movement of the shaft in both direction to a predetermined angular range;

and wherein the moving means includes translation means connected to the engaging means for translating rotational movement of the shaft to natural movement of said at least one articulated segment;

wherein the translating means includes a slide-guide connected to the shaft and a slide-block mounted to slide along the slide-guide, the engaging means being connected to the slide-block so that the slide-block can move relative to the slide-guide as the shaft rotates the slide-guide;

and wherein the translation means includes cam means mounted on the shaft, cable means connected between the slide-block and cam means, the cam means being shaped and dimensioned so that as the shaft rotates in one direction the cable means engages the cam means and moves the slide-block along the slide-guide so that the engaging means will operate to move any articulated segments connected thereto in the direction of their natural movement, and spring means for returning the slide-block to its initial position when the shaft rotates in its second direction.

10. An apparatus for restoring mobility to the finger joints of the hand, comprising:

a driving member with at least one driving shaft, on which is fixed only one radial slide-guide, said driving member including an electric motor with two directions of rotation, the supply of which motor is controlled by adjustable end-of-stroke contactors;

a sliding block guided by said slide-guide and operationally coupled to a return member urging said sliding block in centrifugal movement with respect to the shaft;

a support for resting the hand, which support extends in parallel to the axis of the shaft;

at least one bar carried by the sliding block and extending in parallel to the support;

means of joining said bar to at least one articulated segment of the hand; and means of driving said sliding block in centripetal movement, in relation to the angular displacement in one direction of the slide-guide driven by the shaft, such that the fingertip of the articulated segment joined to said bar traverses an initially downward spiral path toward the plam of the hand.

11. An apparatus for restoring mobility to the finger joints of the hand, comprising:

a driving member with at least one driving shaft, on which is fixed only one radial slide-guide, said driving member including an electric motor with two directions of rotation, the supply of which motor is controlled by adjustable end-of-stroke contactors;

a sliding block guided by said-guide and operationally coupled to a return member urging said sliding block in centrifugal movement with respect to the shaft;

a support for resting the hand, which support extends in parallel to the axis of the shaft;

at least one bar carried by the sliding block and extending in parallel to the support;

means of joining said bar to at least one articulated segment on at least two fingers of the hand; and means of driving said sliding block in centripetal movement, in relation to the angular displacement in one direction of the slide-guide driven by the shaft.

12. An apparatus for restoring mobility to the finger joints of the hand, comprising:

a driving member with at least one driving shaft, on which is fixed only one radial slide-guide, the slide-guide being angularly wedged on the driving shaft of the driving member;

a sliding block guided by said slide-guide and operationally coupled to a return member urging said sliding block in centrifugal movement with respect to the shaft;

a support for resting the hand, which support extends in parallel to the axis of the shaft;

at least one bar carried by the sliding block and extending in parallel to the support;

means of joining said bar to at least one articulated segment of the hand; and means of driving said sliding block in centripetal movement, in relation to the angular displacement in one direction of the slide-guide driven by the shaft, such that the fingertip of the articulated segment joined to saiad bar traverses an initially downward spiral path toward the palm of the hand.

13. An apparatus for restoring mobility to the finger joints of the hand, comprising:

a driving member with at least one driving shaft, on which is fixed only one radial side-guide, the slide-guide being angularly wedged on the driving shaft of the driving member;

a sliding block guided by said slide-guide and operationally coupled to a return member urging said sliding block in centrifugal movement with respect to the shaft;

a support for resting the hand, which support extends in parallel to the axis of the shaft;

at least one bar carried by the sliding block and extending in parallel to the support;

means of joining said bar to at least one articulated segment on at least two fingers of the hand; and means of driving said sliding block in centripetal movement, in relation to the angular displacement in one direction of the slide-guide driven by the shaft.

14. An apparatus for restoring mobility to the finger joints of the hand, comprising:

a driving member with at least one driving shaft, on which is fixed only one radial slide-guide, the slide-guide being wedged on an intermediate shaft operationally coupled by a remotely driven connection to the driving shaft of the driving member;

a sliding block guided by said slide-guide and operationally coupled to a return member urging said sliding block in centrifugal movement with respect to the shaft;

a support for resting the hand, which support extends in parallel to the axis of the shaft;

at least one bar carried by the sliding block and extending in parallel to the support;

means of joining said bar to at least one articulated segment of the hand; and means of driving said sliding block in centripetal movement, in relation to the angular displacement in one direction of the slide-guide driven by the shaft, such that the fingertip of the articulated segment joined to said bar traverses an initially downward spiral path toward the palm of the hand.

15. An apparatus for restoring mobility to the finger joints of the hand, comprising:

a driving member with at least one driving shaft, on which is fixed only one radial slide-guide, the slide-guide being wedged on an intermediate shaft operably coupled by a remotely driven connection to the driving shaft of the driving member;

a sliding block guided by said slide-guide and operationally coupled to a return member urging said sliding block in centrifugal movement with respect to the shaft;

a support for resting the hand, which support extends in parallel to the axis of the shaft;

at least one bar carried by the sliding block and extending in parallel to the support;

means of joining said bar to at least one articulated segment on at least two fingers of the hand; and means of driving said sliding block in centripetal movement, in relation to the angular displacement in one direction of the slide-guide driven by the shaft.

* * * * *